United States Patent [19]

Yang

[11] Patent Number: 5,477,904
[45] Date of Patent: Dec. 26, 1995

[54] WINDOW CURTAIN ASSEMBLY HAVING A TENSION SPRING RETRACTION MECHANISM

[76] Inventor: Ming-Shun Yang, 2nd Fl., No. 4, Lane 323, Chia-Hsing St., Taipei, Taiwan

[21] Appl. No.: 251,378

[22] Filed: May 31, 1994

[51] Int. Cl.$^6$ ........................................... B60J 3/00
[52] U.S. Cl. .................................. 160/370.23; 160/84.06
[58] Field of Search ..................... 160/370.23, 370.21, 160/84.01, 84.02, 84.04, 84.06; 296/97.7, 97.8, 97.9, 138

[56] References Cited

U.S. PATENT DOCUMENTS

| | | | |
|---|---|---|---|
| 4,473,101 | 9/1984 | Langeler | 160/279 X |
| 4,557,309 | 12/1985 | Judkins | 160/279 X |
| 4,647,102 | 3/1987 | Ebrahimzadeh | 160/DIG. 2 X |
| 4,733,711 | 3/1988 | Schon | 160/279 X |
| 4,862,941 | 9/1989 | Colson | 160/279 X |

*Primary Examiner*—David M. Purol
*Attorney, Agent, or Firm*—Erik M. Arnhem

[57] ABSTRACT

A window curtain assembly includes a foldable curtain have one end attached to a tubular mounting frame so that a handle on the other end of the curtain can be pulled to extend the curtain across the window. The curtain is retracted to a folded condition by a tension spring located within the tubular frame. A tractive tying line has two parallel runs extending along the curtain surface into the tubular frame. Segments of the line extend back and forth around a system of pulleys located within the frame. Two of the pulleys are connected to one end of the spring, so that the spring is able to draw the two pulleys along the frame. The tractive line is drawn into the tubular frame to move the curtain to its folded state.

4 Claims, 8 Drawing Sheets

WINDOW CURTAIN ASSEMBLY HAVING A TENSION SPRING RETRACTION MECHANISM

BACKGROUND OF THE INVENTION

When an automobile is left unattended for a period of time under summertime conditions, solar rays can penetrate the automobile windows to heat the interior space within the automobile to an undesired extent. A person entering the automobile can experience an uncomfortable oppressive burning sensation.

Another problem associated with an unattended automobile is the possibility that a person might look through one of the automobile windows in search of loose items that could be removed or stolen.

SUMMARY OF THE INVENTION

The present invention is concerned with a curtain assembly installable on the window of an automobile for adjustment between an open position along side edges of the window and a closed position spanning the window surface. Such a curtain assembly will prevent solar rays from passing through the window to heat the interior space within the automobile. The curtain assembly will also conceal the automobile interior space from the view of persons passing by the automobile; items left in the automobile are less likely to be stolen.

In a preferred practice of the invention, two curtain assemblies are used for the front window of an automobile. Each curtain assembly comprises a tubular frame installable along one edge of the window, and a foldable accordian-type curtain having one edge secured to the tubular frame; a handle at the free edge of the curtain can be pulled to draw the curtain across the window. Each curtain assembly spans one half of the window area.

Each foldable curtain is folded against the associated tubular frame by a retraction mechanism located within the frame. A tension spring is used in conjunction with a line-pulley system to move one set of pulleys away from a set of non-movable pulleys, whereby a flexible line (or cord) trained around the pulleys is drawn into the tubular frame to retract the curtain to a folded condition against the frame.

In an extended usage of the invention, a foldable curtain structure according to the invention can be used on the window of a building for privacy or shade purposes.

DETAILED DESCRIPTION

Figure 1:
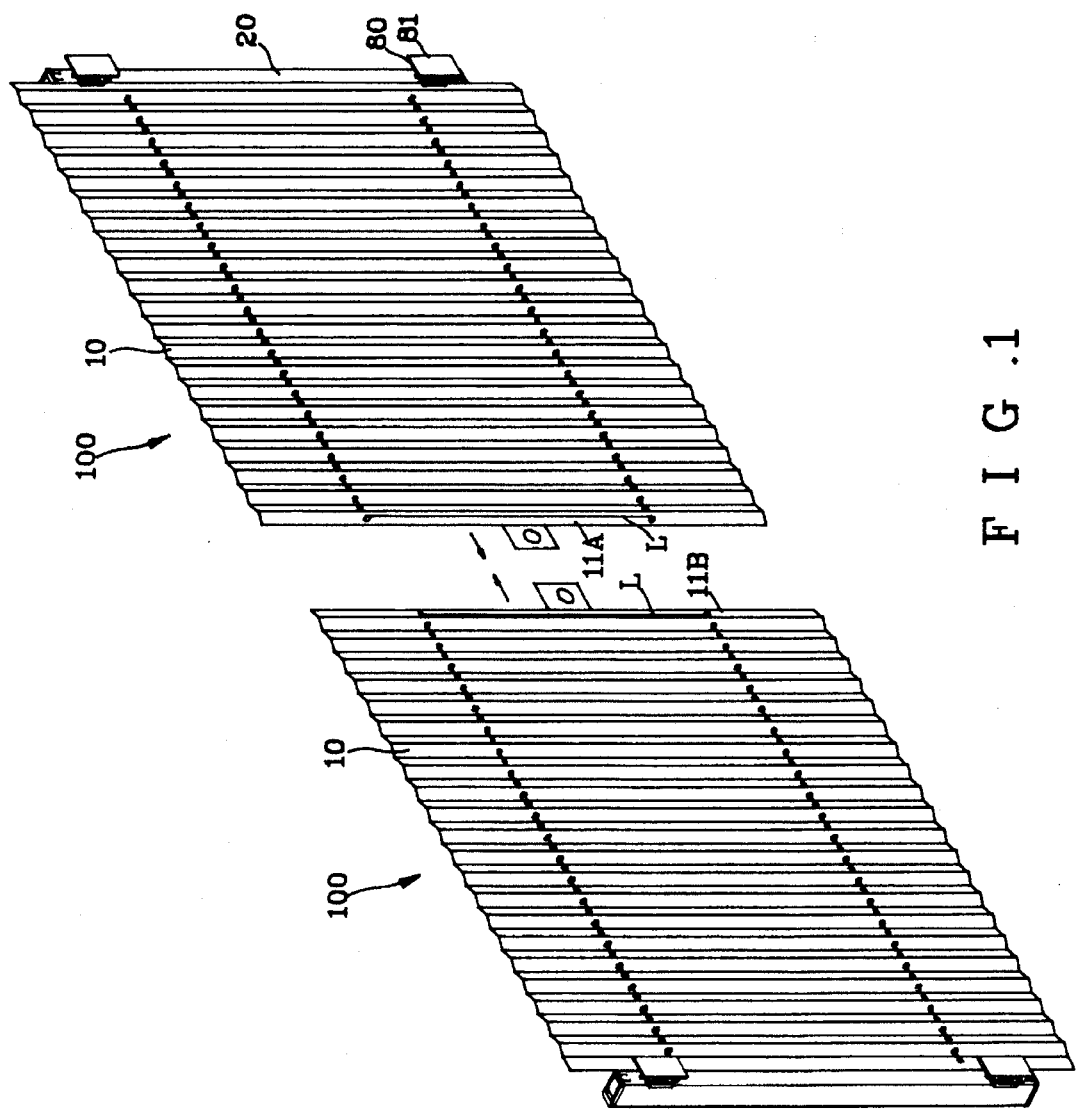
FIG. 1 is an elevational perspective view of a pair of curtain assemblies constructed according to the present invention.
Figure 2:
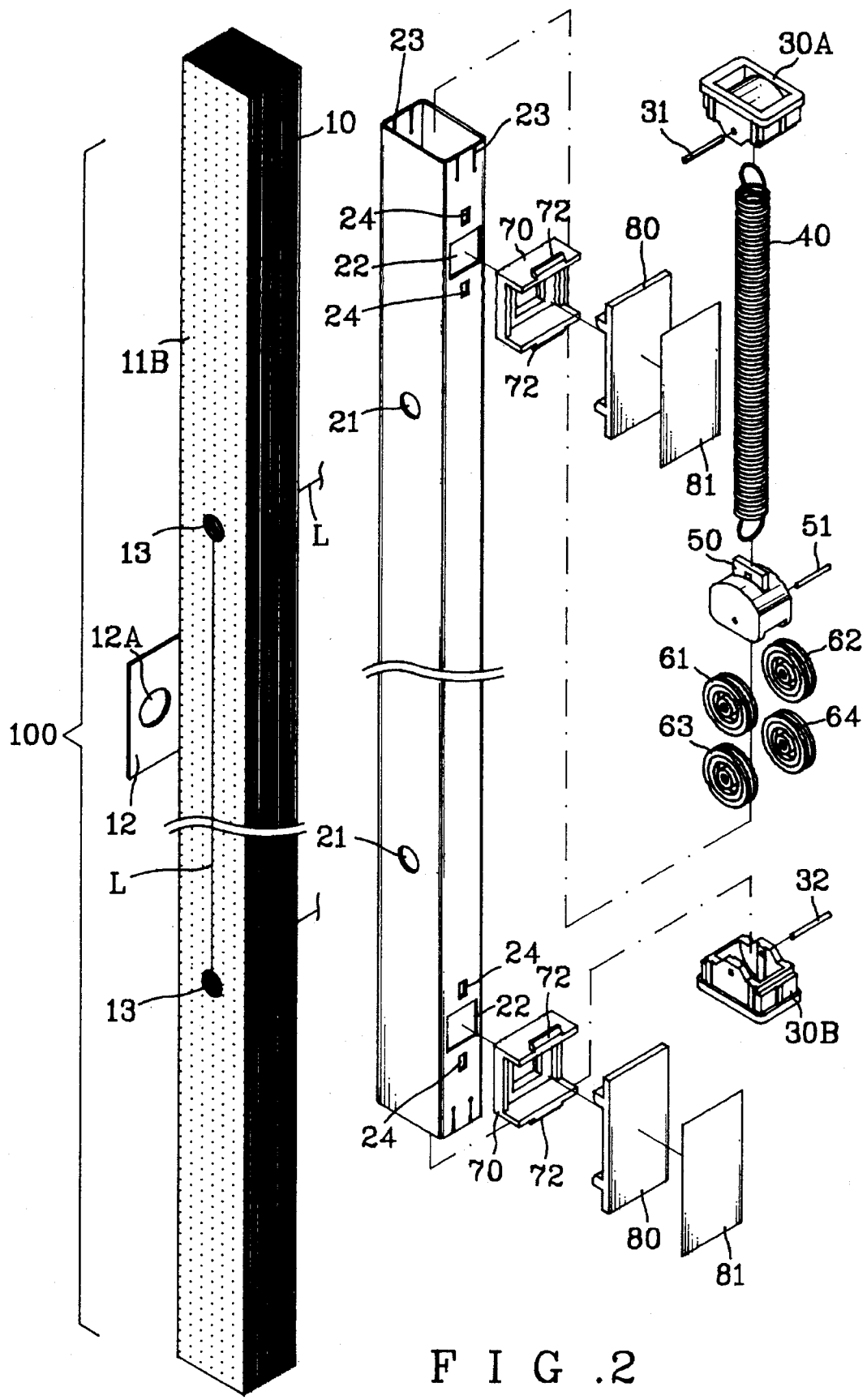
FIG. 2 is an exploded view of componentry used in the FIG. 1 curtain assembly.

As shown in FIG. 1 and 2, there are two visor combinations or window curtains (100) constructed according to the present invention for installation on the front and rear windshield glass of a car for preventing sunshine and light from entering the car interior space. The visor combination device consists of two separate but symmetric visor devices (100) each one of which consists of a foldable visor curtain (10), a long tubular frame (20) and a tractive tying line L. One end of the foldable visor curtain (10) is fixed on the tubular frame (20), while the other end thereof is provided with a hook-and-loop fastener patch 11A or 11B for mutual adhesion of the two visor devices (100) when the respective curtains are extended across the window. Each curtain (10) has a pull handle (12) with a hole (12A) designed for manually drawing the visor curtain (10) across the window.

As shown in FIG. 2, the tubular frame (20) is a hollow tube having upper and lower ends, and two holes (21) spaced from the tube ends. The tube also has two sets of mounting holes (22) and (24) for attaching pads to the tube. The holes (21) are aligned with holes (13) on each folding strip of the visor curtain (10) to form passages for the tractive tying line L; as seen in FIG. 4, the tractive tying line L includes two parallel runs passing through the aligned holes 13 in the foldable strips of the curtain.

Figure 3:
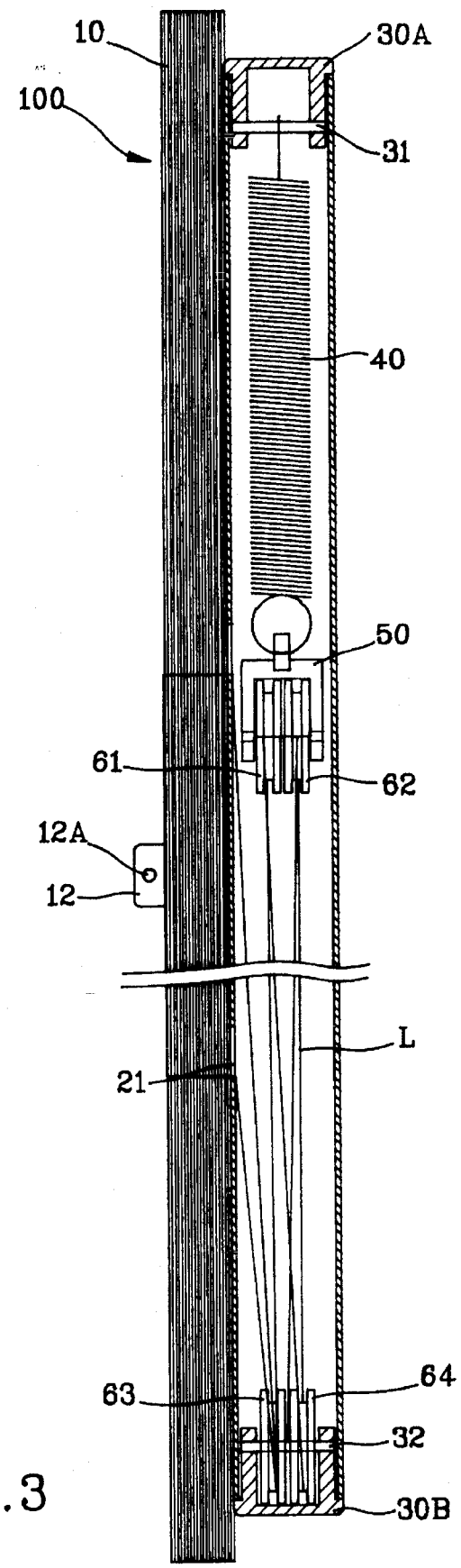
FIG. 3 is a sectional view of a curtain assembly of the present invention in a folded state.
Figure 4:
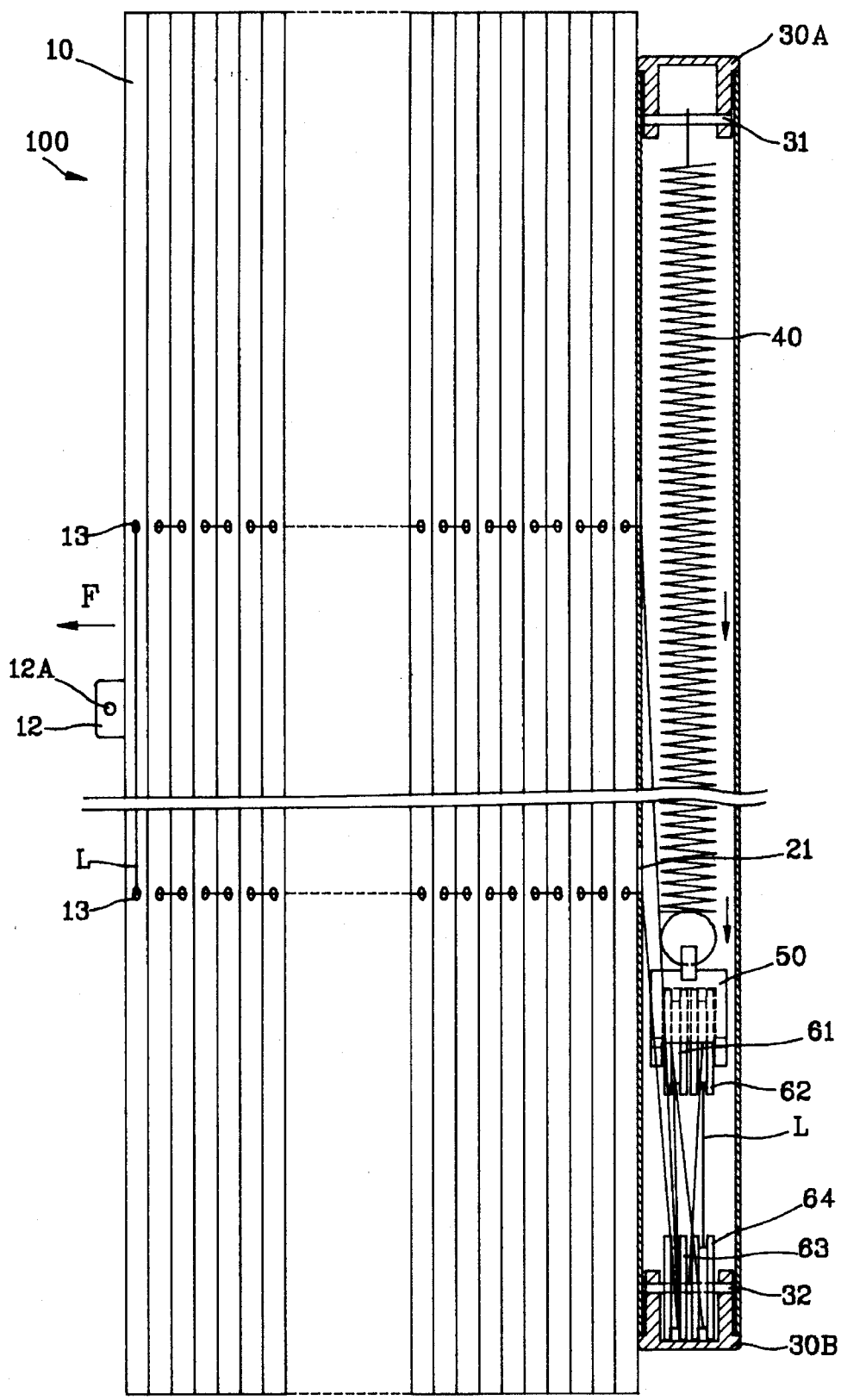
FIG. 4 is an elevational view of a curtain assembly of the present invention in an open state.

Referring to FIGS. 2 through 4, tube (20) is provided with an upper cover (30A) and a lower cover (30B). The upper cover (30A) comprises a rod (33) that forms an anchorage for one end of a tension spring (40). The other end of Spring (40) is anchored on a pulley seat (50). Two pulleys (61,62) are rotatably mounted on a pin (51) in the pulley seat (50).

The lower cover (30B) on tube (20) carries a pin (32) that rotatably mounts two pulleys (63). The aforementioned tractive tying line L runs back and forth around the four pulleys so as to actuate the foldable visor curtain (10) between the extended condition (FIG. 4) and the collapsed condition (FIG. 3).

Figure 5:
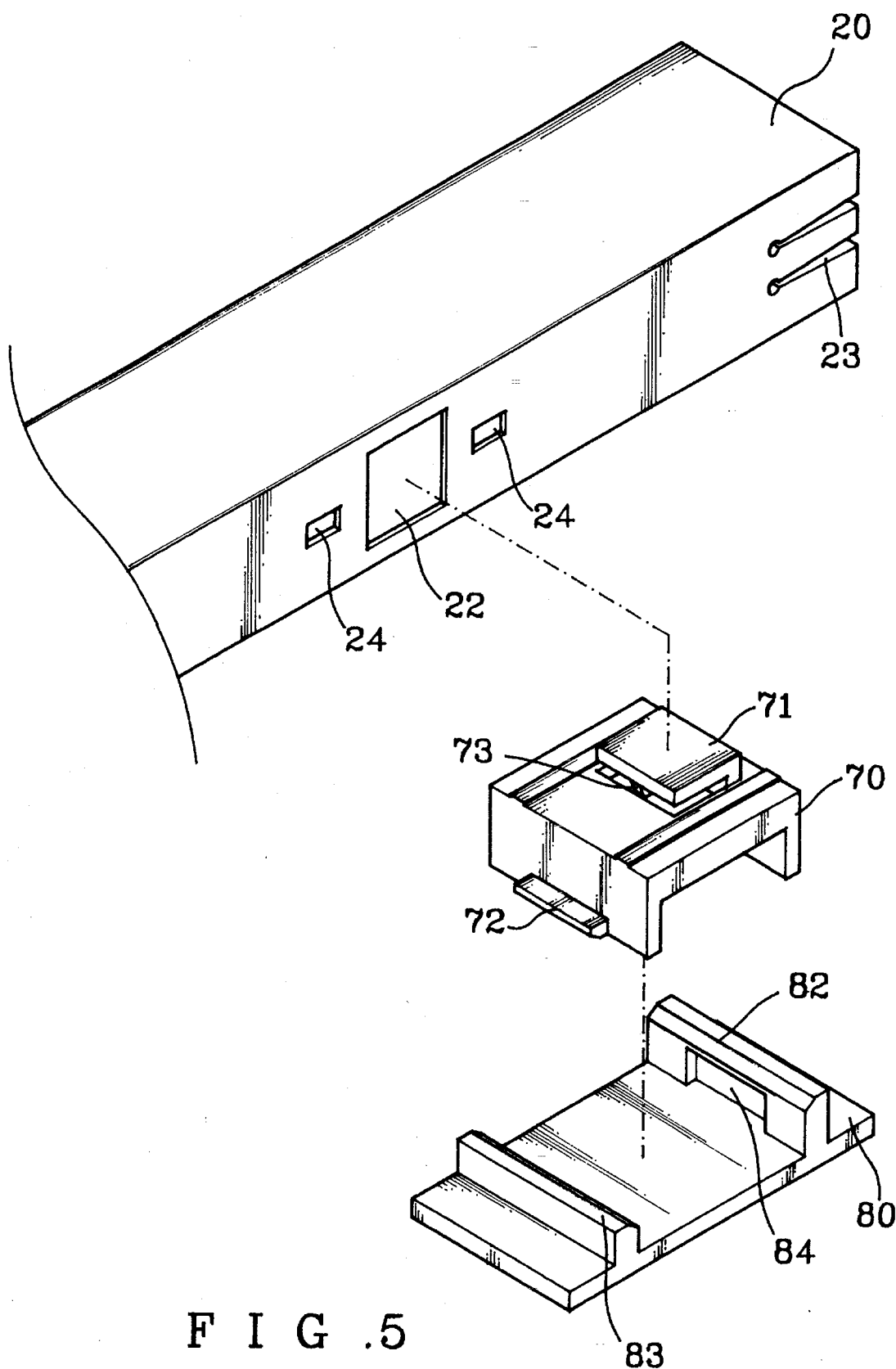
FIG. 5 is an exploded view of a frame mounting mechanism used in the present invention.
Figure 6:
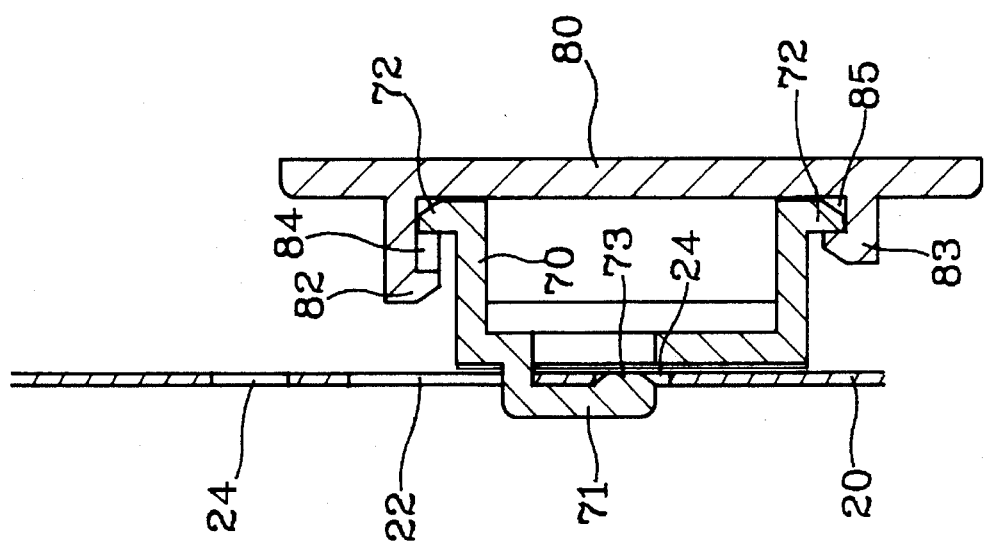
FIG. 6 a sectional view taken through the frame mounting mechanism shown in FIG. 5.

As shown in FIGS. 2, 5 and 6, the tubular frame (20) is provided with mounting pads (70) and (80) near its upper and lower ends. Each pad (70) is provided with a hook structure (71) and two oppositely facing lugs 72. Each pad (80) forms two facing grooves or pockets (84,85) containing the lugs (72). A flat outer surface on each pad (80) is provided with a double-face glue-spreading adhesive tape (81) through which the visor device of the present invention can be adhered to the windshield glass of a car (not shown).

Figure 7:
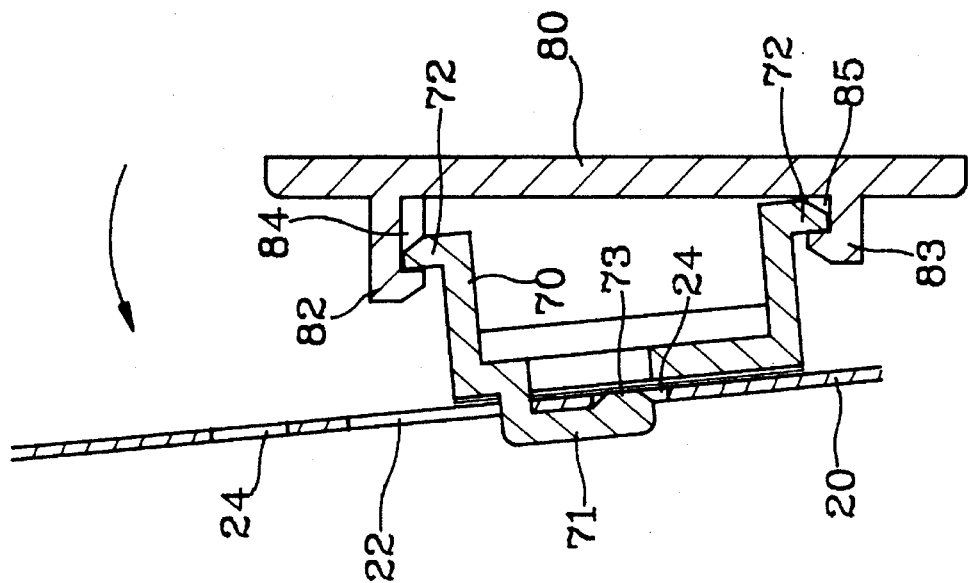
FIG. 7 is a view taken in the same direction as FIG. 6 but showing the mechanism in a different condition of adjustment.

As seen in FIGS. 6 and 7, each groove (84) is wider than the associated groove (pocket 85), such that the pad (70) can pivot relative to pad (80), whereby pad (80) can conform to a range of different window curvatures.

As shown in FIGS. 5, 6 and 7, pad (70) can be assembled to tubular frame (20) by inserting hook structure (71) through hole (22) so that the protuberance (73) on the hook structure enters into the detent hole (24) located alongside hole (22). Each pad (80) is pivotably adjustably connected to the associated pad (70), via lugs (72) and pockets (84,85) whereby the pad assembly can be used to mount the tubular frame (20) on a curved windshield of an automobile.

As shown in FIG. 2 and 3, when the visor device (100) of the present invention is folded, the tractive tying line L extends through holes (13) on each folding strip of the visor curtain (10) and holes (21) on tubular frame (20). Within tube (20), the tractive tying line L is integrated into a single ply to wind around the pulleys (63, 61, 64, and 62)in sequence; finally the ends of the tractive tying line L are fixed or anchored in the grooves (23) on tube (20) (see FIG. 2).

As shown in FIG. 3, when the visor curtain (10) is folded the tension spring (40) in tube (20) is not subject to the tractive action of external force but is in a retracted state. However, as shown in FIG. 4, when the visor curtain (10) is to be extended, a manual force F is applied to the pull handle (12) to extend the visor curtain (10); the tractive tying line L is pulled out from tube (20) so as to draw the tension spring (40) and the pulleys (61,62) on the pulley seat (50), downwardly, to thereby let the visor curtain (10) extend away from tube (20), as shown in FIG. 4

The present invention consists of two symmetric similarly-constructed visor devices (100), so that the two curtains (10) are extended the hook-and-loop patches 11A and 11B can be adhered together to hold the two curtains in extended (closed) positions; patches 11A and 11B serve as latches to keep the curtains closed. The visor assemblies (100) can be used on the front and rear windshield glass of a car to prevent solar heat and light from being transmitted into the car, especially when the car is left unattended outdoors for extended periods of time.

Figure 8:
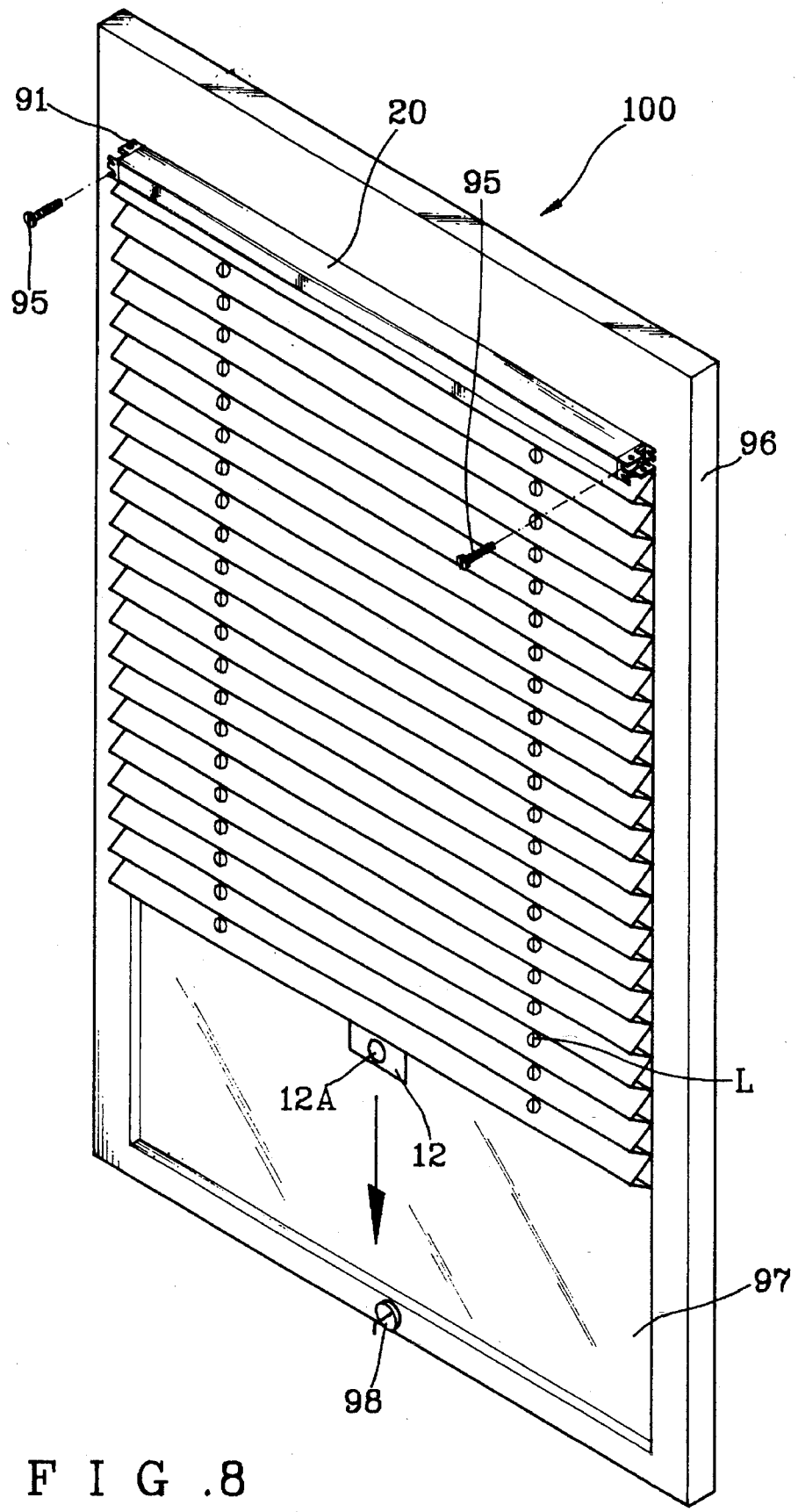
FIG. 8 is a perspective view of a curtain assembly used on a building window.
Figure 9:
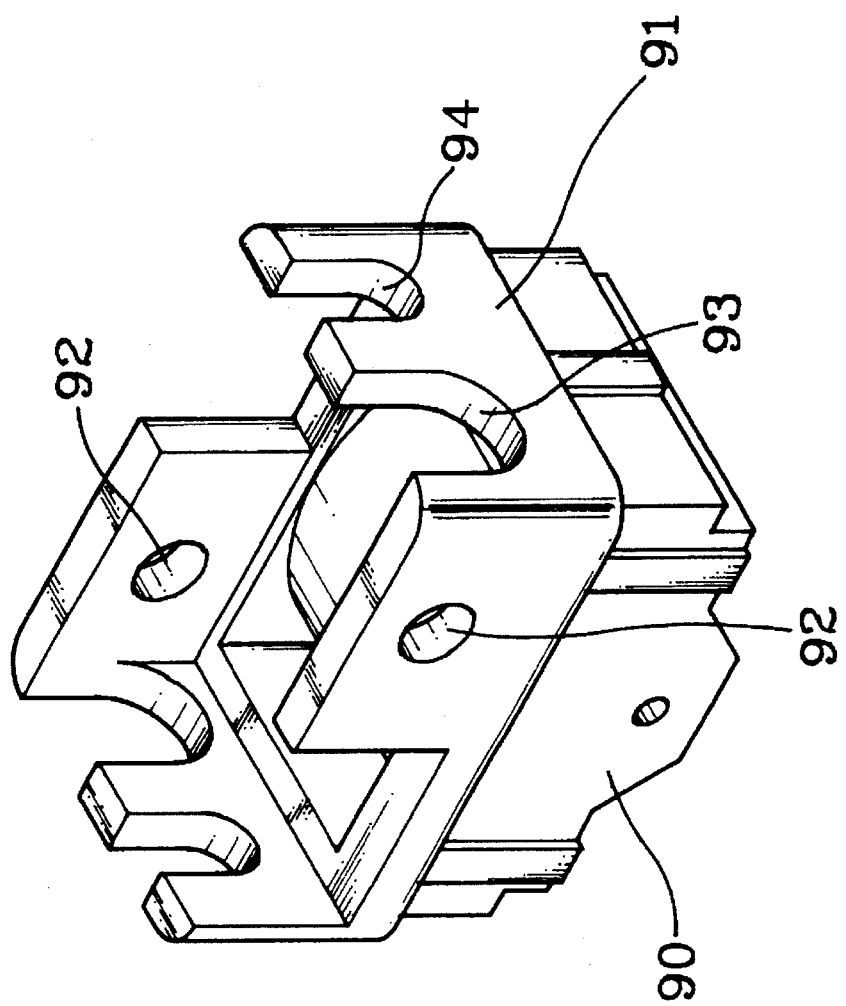
FIG. 9 is a perspective view of a mounting device used on the FIG. 8 curtain assembly.

FIG. 8 shows a single curtain assembly installed on an indoor window (97) of a building. In such an installation it is not necessary to provide mounting pads (70) and (80) for mounting tube (20) on the window. Instead, the covers (91) at the ends of the tube (20) can be provided with mounting holes or notches. As shown in FIG. 9, a tube end cover (91) has threaded holes (92), and notches (93) and (94) for receiving screws (95) (FIG. 8), whereby tube (20) can be mounted on the aluminum frame (96) of a building window (97). Alternately, a hook-and-loop fastener with a hook side (or loop side) can be adhered to the back of tube (20, and a hook-and-loop fastener with a corresponding loop side (or hook side) can be adhered to the aluminum window frame (96), in order to mount tube (20) on the window frame.

When the visor device (100) is used as the visor of indoor window (97), the hook hole (12A) on the pull handle (12) can be engaged on a nail (98) on the frame (96), to hold the curtain in its extended position. The mechanism for retracting the curtain to its folded (open) state can be the same as shown and described for the car window-curtain assembly.

I claim:

1. A visor assembly installable on a window comprising:
   a tubular frame (12) having first and second ends;
   a foldable curtain (10) having first an second end edges; said first end edge being secured to said tubular frame; a handle (12) on said second edge for exerting a manual pulling force on said curtain;
   a spring anchorage means (31) at the first end of said tubular frame; first and second pulleys (63,64) mounted within said tubular frame at said second end of said frame; a pulley seat means (50) floatably disposed within said tubular frame; third and fourth pulleys (61,62) mounted on said pulley seat means;
   a tension spring trained between said spring anchorage means and said pulley seat means to exert a force pulling said first and second pulleys away from said third and fourth pulleys; two openings (21,21) in said frame spaced from said frame ends;
   a line anchorage means (23) proximate to said first end of the tubular frame; and
   a tractive tying line (L) having two parallel runs extending from said second edge of the curtain through said openings in said frame; said tractive line further comprising line segments extending back and forth around said pulleys to said line anchorage means, whereby a manual pulling force on said handle moves said third and fourth pulleys toward said first and second pulleys in opposition to the force of said tension spring.

2. A visor assembly comprising two similarly constructed visor units, each visor unit comprising:
   a tubular frame (12) having first and second ends;
   a foldable curtain (10) having first and second end edges; said first end edge being secured to said tubular frame; a handle (12) on said second edge for exerting a manual pulling force on said curtain;
   a spring anchorage means (31) at the first end of said tubular frame; first and second pulleys (63,64) mounted within said tubular frame at said second end of said frame; a pulley seat means (50) floatably disposed within said tubular frame; third and fourth pulleys (61,62) mounted on said pulley seat means;
   a tension spring trained between said spring anchorage means and said pulley seat means to exert a force pulling said first and second pulleys away from said third and fourth pulleys;
   two openings (21,21) in said frame spaced from said frame ends;
   a line anchorage means (23) proximate to said first end of the tubular frame; and
   a tractive tying line (L) having two parallel runs extending from said second edge of the curtain through said openings in said frame; said tractive line further comprising line segments extending back and forth around said pulleys to said line anchorage means, whereby a manual pulling force on said handle moves said third and fourth pulleys toward said first and second pulleys in opposition to the force of said tension spring;
   said similarly-constructed visor units being adapted for positionment on an automobile window, with the tubular frames of the respective units located at the side edges of the window, so that the handles on the respective units can be drawn together to pull the respective curtains across the window.

3. The visor assembly of claim 2, and further comprising means for mounting each tubular frame on an automobile window, each said mounting means comprising a pad assembly at each end of the respective tubular frame; each pad assembly comprising a first pad secured to the associated tubular frane and a second pad pivotably attached to said first pad; said second pad having a flat face presentable to the surface of an automobile window, whereby the pad assembly is securable to the window.

4. The visor assembly of claim 3, wherein each said first pad comprises two oppositely extending extending lugs (72,72), and each said second pad comprises two facing pockets (84,85) receiving therein the respective lugs; one of said pockets being wider than the other pocket so that the lug in said one pocket can move back and forth to provide a pivotable adjustment of the second pad relative to the first pad.

\* \* \* \* \*